Jan. 19, 1971   G. R. WAID   3,557,270

METHOD OF MOLDING VALVE STEMS

Filed Aug. 23, 1967   2 Sheets-Sheet 1

INVENTOR.
GEORGE R. WAID
BY
*Yount, Raney Flynn and Turelli*
ATTORNEYS

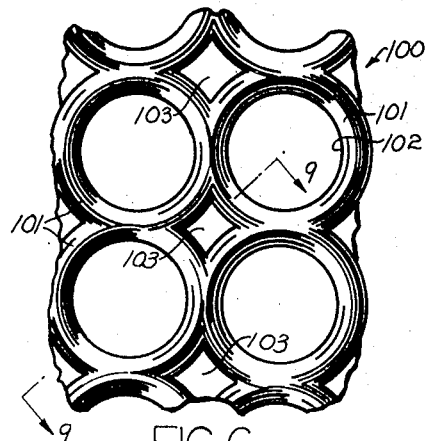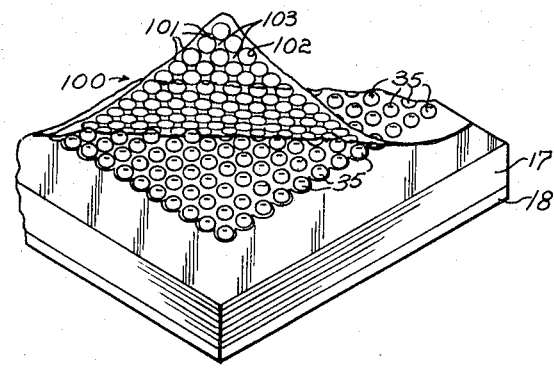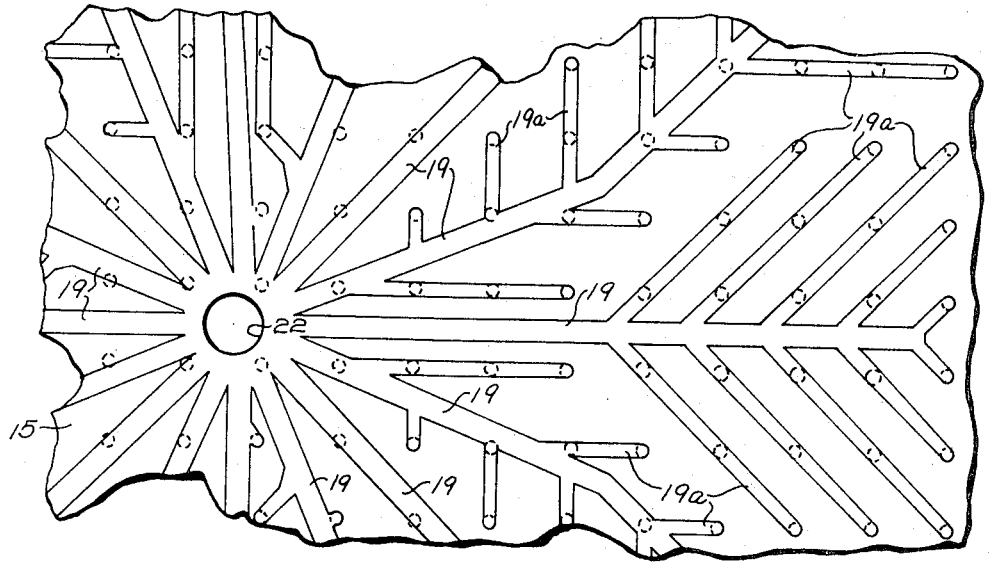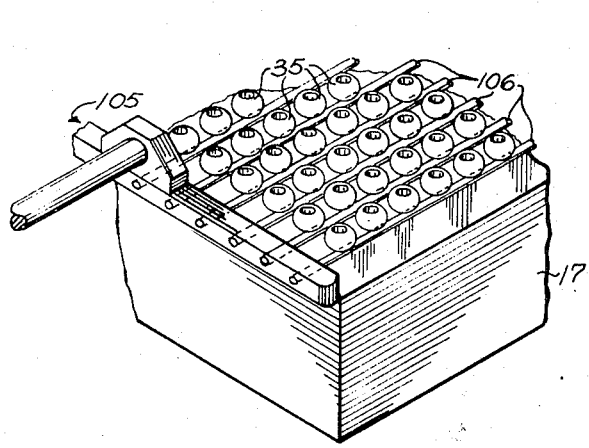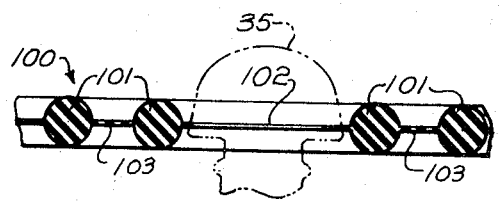

United States Patent Office 3,557,270
Patented Jan. 19, 1971

3,557,270
METHOD OF MOLDING VALVE STEMS
George R. Waid, Willoughby Hills, Ohio, assignor to Eaton Yale & Towne Inc., Cleveland, Ohio, a corporation of Ohio
Filed Aug. 23, 1967, Ser. No. 662,713
Int. Cl. B29c 17/14; B29f 1/00
U.S. Cl. 264—161                                           1 Claim

ABSTRACT OF THE DISCLOSURE

In a method for molding valve stems for tires of an automotive vehicle, molding material is injected into a multipart mold under sufficient pressure to flow between the cavity forming mold members at the interface therebetween and into secondary cavities. As a result, a continuous mat of material surrounds the molded articles. The mat includes relatively thick portions formed in the secondary cavities. This mat is removed from the mold and readily separates from the valve stems in a uniform manner.

The present invention relates to a method for molding articles, and more particularly relates to a method for molding articles wherein the article is produced in such a manner that problems relating to flash on the article are greatly minimized.

Molded articles are commonly made in multipart molds and, therefore, will generally have a band of flash thereon produced by the molding material being urged under pressure between mating surfaces of the mold parts surrounding the article forming mold cavity. The extent of the band or flash line depends upon the characteristics of the engagable surfaces of the molding parts, the force urging the mold parts into engagement, and the pressure under which the molding material urged into the cavity formed by the mold parts. Where the finished molded article is formed from rigid material, the flash on the finished article may be filed, sanded or ground off by suitable machinery to provide for a continuous surface on the article; however, when the finished article is formed from a relatively resilient material, such as a synthetic rubber or the like, the flash on the article is extremely pliable and is difficult to remove by the above noted methods. In some cases, the use of such flash removing processes may in themselves adversely affect the intended function of the molded article. When flash is permitted to remain on the molded article, the flash can cause malfunctioning of the article and even in the cases where the flash has no adverse affect upon the functioning of the article, prospective purchasers sometimes believe that the article is defective because of its irregular appearance.

The problems with flash noted above in regard to articles molded from resilient materials, are particularly prevalent in the manufacture of tire valve stems for tires of automotive vehicles or the like. Tire valve stems are commonly formed in a cavity provided by two die plates with fluent uncured synthetic rubber molding material being injected into the cavity under pressure to provide the finished article configuration. Since in most cases the molding material is injected into the cavity under pressure, a considerable amount of flash can be formed at the interface of the mold parts forming the cavity. In the past, the flash produced on tire valve stems has been removed by tumbling the stems in Dry Ice so that the flash is chilled to rigid or brittle condition and is then broken off by the tumbling. It has been found, however, that the removal of flash from valve stems by low temperature tumbling, as well as the other aforementioned methods, is more expensive per valve stem than the cost involved in initially producing the stem itself, and as a consequence, valve stems having excessive flash thereon are simply thrown away, resulting in a loss of time, materials, and production capacity.

The production of molded articles such as valve stems is generally carried out in a muti-cavity mold by an injection molding process so that a maximum number of tire stems per molding operation may be obtained. The number of cavities in a mold of the type referred to has in the past been limited due to relatively high injection pressures necessary to distribute the molding material uniformly to all of the cavities. On the other hand, utilization of high injection pressures, which might otherwise be sufficient to fill a large number of mold cavities, results in pressure forces tending to urge the mold parts away from each other, causing excessive flash on at least some of the valve stems produced. For this reason, the number of cavities obtainable in the molding apparatus has been limited to that number which can be effectively supplied by a given injection pressure of the molding material, but which injection pressure is not sufficient to cause an excessive amount of flash to be formed on the stems. It should also be apparent that if injection pressures are not maintained at a high enough level, the cavities in the molding apparatus may not be completely filled, resulting in defective parts, and therefore injection pressures in the prior art devices must be controlled at an optimum level.

Heretofore, commercially obtainable molding apparatus for valve stems has provided for molding of less than 100 valve stems per molding operation, has been relatively expensive, and has not guaranteed either completion of the molded articles or the absence of excessive flash on the articles, so that inspection of the finished valve stems was necessary.

A principal object of the present invention is the provision of a new and improved method for molding articles in a multipart mold wherein a single molding operation produces a number of articles substantially greater than that number heretofore produced, and wherein the articles have a uniform appearance without the necessity of a flash removing operation subsequent to the molding; and which is sufficiently reliable in operation to obviate the need for inspection of the articles.

Another object of the present invention is the provision of a new and improved method for making trimless molded articles wherein a plurality of article forming cavities and adjacent secondary cavities are provided between mold members, molding material is injected into the mold assembly to fill the article forming cavities and flows therefrom into the secondary cavities, the material is solidified to form the articles and a mat of the molding material between the mold parts, the mold members are disassembled, and the mat of material is stripped from the articles carried by one mold member to uniformly sever excess material from the articles.

A further object of the present invention is the provision of a new and improved method of forming a molded article wherein an article forming cavity is provided by a pair of mold members which are urged together in pressure relationship and a secondary cavity is provided between the mold parts closely adjacent a boundary thereof; molding material is injected into the cavity at a pressure which is sufficient to just overcome the engagement pressure between the mold parts with the amount of molding material injected into the cavity being sufficient to force a flow of the molding material between the engaging surfaces of the mold parts adjacent the boundary of the article forming cavity and into the secondary cavity to provide a molded article connected to an adjacent molded body by a narrow film of material; and in which the narrow film of material is severed by separating the molded body from the molded article to produce a "flashless" or "trimless" molded article.

Other objects and advantages of the present invention will become apparent from consideration of the following detailed description thereof made with reference to the accompanying drawings which form a part of the specification and in which:

FIG. 6 is an enlarged fragmentary view taken approximately within the line 6 of FIG. 7;

FIG. 7 is a fragmentary sectional view of a portion of the apparatus shown in FIG. 1 and illustrating a step in the manufacture of the article of FIG. 2;

FIG. 8 is an enlarged fragmentary view of a portion of the apparatus of FIG. 1 and taken approximately at the line 8—8 of FIG. 1;

FIG. 9 is a fragmentary sectional view taken approximately at line 9—9 of FIG. 6; and FIG. 10 is a fragmentary perspective view of a portion of the apparatus of FIG. 1 illustrating a step in the manufacture of the article of FIG. 2.

Figure 1:
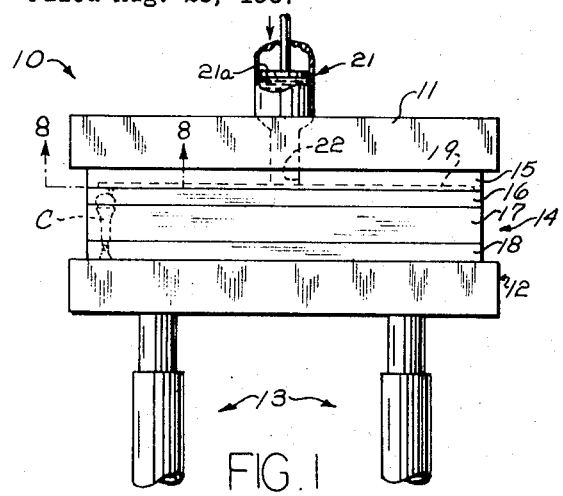
FIG. 1 is a schematic illustration of molding apparatus embodying the present invention.

The present invention provides an improved method for molding an article from rubber-like material wherein the finished article is essentially "flashless" or "trimless" in that the material on the article adjacent the part line between separable parts of the molding apparatus is in the form of a narrow uniform band of material which need not be removed by manufacturing operations subsequent to molding. FIG. 1 is a schematic illustration of injection molding apparatus 10 for carrying out the invention and which includes a suitable press having a fixed top or upper platen 11, a lower platen 12 which is associated with force transmitting means 13, such as hydraulic cylinders, for urging the lower platen 12 toward the fixed upper platen 11 to compress a mold assembly generally designated at 14, between the platens.

The mold assembly 14 includes four generally rectangular plates or plate assemblies which are assembled in stacked relationship upon the lower platen 12 for compression between the upper and lower platens. More specifically, the mold assembly 14 includes a runner plate 15 engaged by the upper platen 11, a top plate assembly or mold member 16, a bottom plate or mold member 17, and a spacer plate 18. The top and bottom plates 16, 17, respectively, provide a plurality of mold cavities C therebetween when assembled as illustrated in FIG. 1 and which mold cavities communicate with channel-like runners 19 formed in the runner plate 15 by way of sprue holes 20 which interconnect the runners 19 and the aforementioned mold cavities C.

The cavities C are adapted to be filled by a pressurized fluent molding material which is introduced into the cavities by operation of molding material injection means 21, shown schematically in the form of a piston-cylinder type material injector, associated with the upper platen 11 and communicating with the runners 19 of the runner plate 15 through a suitable flow passage 22 which extends through the runner plate (see FIG. 8).

Figure 2:
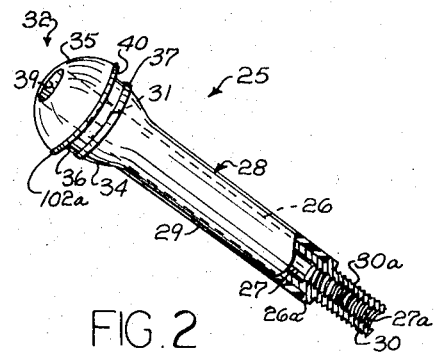
FIG. 2 is a perspective view of a tire valve stem produced in accordance with the present invention.

While the apparatus 10 may be used to mold any suitable articles from appropriate molding materials, the apparatus 10 is illustrated and described herein in conjunction with the production of tire valve stems molded from rubber-like material which is in a fluent state when injected into the cavity and is subsequently solidified or cured in the mold. A typical tire valve stem 25 of the type produced by the apparatus 10 is illustrated in FIG. 2 and is a composite member including a generally cylindrical valve supporting member 26 formed of a metallic material, such as brass, having a bore 27 therethrough for reception of a tire valve, and a body 28 of rubber-like material vulcanized to the valve supporting member 26. The body 28 includes a sleeve portion 29 which is molded about the valve supporting member 26 from a point adjacent a threaded end 30 of the support member 26 substantially to the opposite end 31 of the support member. The sleeve 29 tapers gradually outwardly from the support member 26, proceeding in the direction of the end 31, and an enlarged head portion 32 is provided on the body 28 which surrounds the end 31 of the valve support member 26 and extends beyond the end 31. Due to the aforementioned construction, the enlarged head portion 32 is more or less unsupported by the member 26, and thus is resiliently flexible.

The head portion 32 of the body 28 is formed in part by a gently curved portion 34 contiguous with the sleeve portion 29 which surrounds the end 31 of the valve support member 26, and a generally spherically curved end portion 35, of greater diametrical extent than the portion 34. The portion 34 of the body 28 is supported by the end 31 of the member 26 and is therefore relatively rigid while the end portion 35 extends beyond the valve support member 26 to provide a relatively soft and flexible terminal portion of the valve stem. The enlarged portions 34 and 35 are separated from each other by a groove 36 having one side formed by an annular bead 37 of resilient material on the portion 34 and its other side formed by a substantially radially extending wall 38 of the enlarged end portion 35. The head portion 32 surrounds an axially extending opening 39 which communicates with the bore 27 in the member 26 to provide the usual air passage through the valve stem.

The valve stem 25 is insertable through an aperture in a tire rim. The aperture in the rim, as is well known, is such that a tight fit between the boundary of the aperture and the base of the groove 36 is provided when the valve stem is inserted.

Referring again to the apparatus for producing the valve stem 25, it should be noted that the plates 15–18 of the mold assembly 14 are generally rectangular, as viewed from above in FIG. 1, and the cavities C are disposed in a "square" array within the plates 16, 17. In the illustrated embodiment, all of the cavities C and the mold structure forming the cavities are substantially the same, and therefore only a single cavity construction, in its relation to adjacent cavity constructions, will be described in detail herein.

Figure 3:
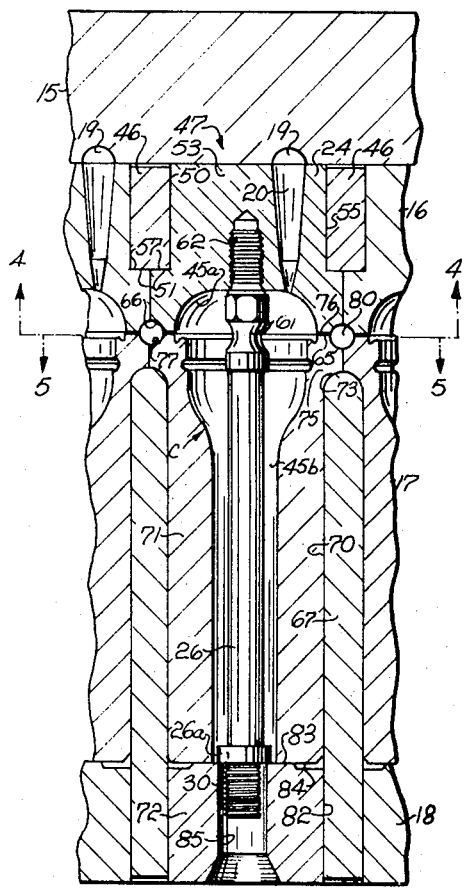
FIG. 3 is a fragmentary sectional view of a portion of molding apparatus embodying the present invention.
Figure 4:
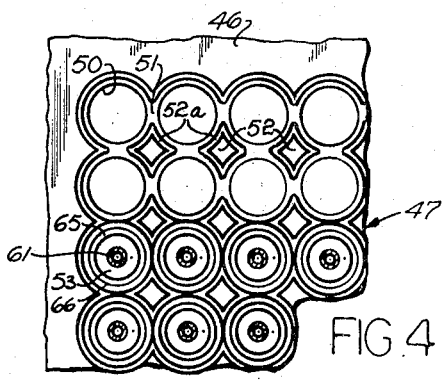
FIG. 4 is a fragmentary sectional view taken approximately at the line 4—4 of FIG. 3 and shown on a scale which is different from the scale of FIG. 3.

A portion of the molding apparatus for producing the valve stem 25 is shown in FIG. 3 and it is apparent from the figure that the elastomeric body 28 of the valve stem 25 is formed in the cavity C which is composed of a first cavity part 45a provided in the top plate 16 and a second cavity part 45b provided in the lower plate 17. As illustrated in FIG. 3, the top plate 16 is composed of an assemblage of elements including a plate member 46 and cavity forming means 47 fixedly secured to the plate member 46. More specifically, the plate member 46 is provided with a plurality of closely spaced bores 50 extending through the plate member and which bores 50 are formed in part by shoulder portions 51 which are of such diametrical extent that the shoulder portions of adjacent bores 50 are tangent and the material between adjacent bores is removed to provide a plurality of downwardly extending generally diamond-shaped projections 52 on the plate member 46 (see FIG. 4).

Cavity forming means 47 is comprised of a plurality of inserts 53 which are suitably fixed in the bores 50, such as by press fitting, and which inserts 53 include a cylindrical body portion 54 having an outer peripheral surface 55 in snug contact with the bore 50 and an enlarged generally annular portion 56 at the lower end thereof providing a shoulder 57, which in the assembled condition of the top plate 16, seats upon the shoulder 51 of the bore 50. The axial length of the insert member 53 is greater than the thickness of the plate member 46 so that the inserts 53 are in bearing relationship with the runner plate 15 and cooperating surfaces of the bottom plate 17 (which is described in detail presently) when the mold assembly 14 is in the apparatus 10 of FIG. 1.

Each insert member 53 forms one cavity portion 45a which is configured to form the terminal part of the enlarged end portion 35 of the valve stem 25 and is provided with a threaded opening 60 extending upwardly from the cavity portion 45a along the axis thereof for receiving a threaded stop member 61. The stop member 61 extends into the cavity C to provide a support for the member 26 which is disposed in the cavity C during the molding operation, as well as to provide the opening 39 in the head portion 35 of the valve stem 25 referred to above. Additionally, the insert member 53 includes a sprue hole 20, as noted above, which extends between the runner plate 15 and the cavity C in the mold assembly for the introduction of fluent molding material from a runner 19 in the runner plate 15 to the cavity C.

The flange portion 56 of the insert 53 additionally includes a downwardly facing annular land surface 65 surrounding the cavity portion 45a and which is adapted for pressure engagement with the bottom plate 17. The surface 65 is bounded at its outer periphery by a rounded circumferential fillet 66 formed in the insert member 53, which cooperates with similar fillets formed in adjacent insert members 53 to provide a semi-circular annular recess adjacent the land surfaces 65 of the inserts 53. It should be noted that the generally diamond shaped projections 52 are also provided with rounded fillets 52a at each edge thereof so that the semicircular recesses extend continuously about the land surfaces 65. While the radial extent of the lands 65 has been illustrated as relatively large in proportion to the size of the vavle stem part 25, it is to be understood that the extent of these lands, in practice, is relatively small and is preferably 0.050 inch or less.

Figure 5:
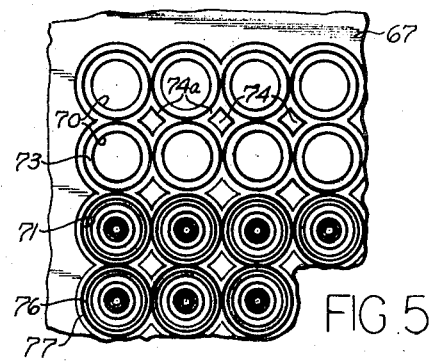
FIG. 5 is a fragmentary sectional view taken approximately at the line 5—5 of FIG. 3 and shown on a smaller scale than that of FIG. 3.

The bottom plate 17 is similar in construction to the top plate 16 in that the bottom plate is comprised of a plate member 67 having a plurality of bores 70 therein which correspond in number and location to the bores 50 in the top plate 16, and with each of the bores 70 receiving cavity forming means in the form of insert members 71, 72 in fixed relation thereto. As best illustrated in FIGS. 3 and 5, each bore 70 extends through the plate member 67 and is generally cylindrical in shape except for an upper annular shoulder 73 formed therein which is tangent to shoulder portions 73 formed on adjacent bores and which provide upwardly extending generally diamond shaped projections 74 of the plate member 67 which projections are provided with fillets 74a at their edges (see FIG. 5) as described above in reference to the projections 52 on the upper plate 16.

The inert member 71 is received in the bore 70 and includes a shouldered upper portion 75 which is seated upon the shoulder 73 of the bore 70, and as illustrated in FIG. 3, the insert member 71 forms the cavity portion 45b which is located therein for registration with the cavity portion 45a of the corresponding insert member 53. The cavity portion 45b is open at the opposite axial ends of the insert member 71 with the upper insert portion 75 surrounding the end of the cavity portion 45b which forms the curved portion 34 and groove 36 of the valve stem 25. The end portion 75 of the insert member 71 includes an upwardly facing land surface 76 which surrounds the cavity portion 45b and is engageable with the land surface 65 on the insert member 53 to provide for continuous surface engagement of the insert members 71, 53 when the plates 16, 17 are assembled as illustrated in FIG. 1.

A circumferential fillet 77 extends about the land surface 76 so that adjacent insert members 71 cooperate with each other and with the projections 74 to provide a semi- circular recess about the circumference of the insert member 71, which recess is in registry with the recess formed by the insert members 53 and projections 52 on the top plate 16 to provide what may be termed a secondary cavity 80 surround the land surfaces 65, 76. Since adjacent insert members are tangent to each other, it is apparent that the secondary cavities 80 surrounding each cavity C communicate with secondary cavities around each adjacent cavity C.

In the illustrated embodiment of the invention, the secondary cavity 80 is circular in cross section (see FIG. 3) and extends continuously about the surfaces 65, 76, but it is apparent from the following description that the secondary cavity may be of any suitable configuration and cross sectional shape and can be formed by a recess or relieved portion on only one of the mold plates.

The insert member 72 is a generally cylindrical member having its outer periphery 82 in tight engagement with the bore 70, an upper annular bearing surface 83 which engages a lower annular surface 84 of the insert member 71, and a central bore 85 communicating with the chamber 45b which central bore is of smaller diametrical extent than that of the chamber 45b at the lower end of the insert member 71 so that an annular shoulder is formed at the lower end of the chamber 45b.

With the surfaces 83, 84 of the insert members 71, 72 engaged as shown in FIG. 3, the total axial dimension of the insert members 71, 72 is slightly greater than the thickness of the plate member 67 so that when the top and bottom plates 16, 17 are urged into compressive engagement in the press 10, the insert members 53 and 71, 72 of the respective plates carry the compression loading and the land surfaces 65, 76 of the insert members 53, 71, respectively, are urged into pressure engagement with each other.

In assembling the mold parts preparatory to a molding operation, the spacer plate 18 and bottom plate 17 are suitably fixed upon the lower platen 12 of the press 10. The valve supporting members 26 are then inserted into the cavity portions 45b of the bottom plate 17 so that an annular flange 26a, provided on the member 26, seats against the surface 83 of the insert member 72 as shown in FIG. 3. Engagement between the annular flange 26a and the surface 83 provides a closure for the bottom of the cavity C which is effective to seal the cavity C against leakage of molding material therefrom while air which may be trapped in the cavity C by the molding material is bled from the cavity. In the preferred embodiment, the surface 83 is provided with three radially extending score lines (not shown) which are preferably no more than 0.003 inch deep, and which permit air trapped in the cavity C by injection of the molding material to be forced from the cavity between the flange 26a on the valve support member 26 and the surface 83. The score lines are of sufficiently small size that flow of the relatively viscous molding material therealong is greatly impeded.

When the valve supporting members 26 are inserted into the cavity portions 45b of the bottom plate 17 and are suitably supported in a vertical orientation with respect thereto, the top plate 16 and runner plate 15 are assembled to the bottom and spacer plates 17 and 18, respectively, so that the cavity portions 45a, 45b of each of the cavities C are accurately registered with each other and the valve support members 46 are firmly compressed between the surface 83 of the insert member 72 and the member 61 connected to the top plate 16.

It should be appreciated that the above described construction of the molding apparatus requires accurate registration of the mold parts when assembled, and to this end suitable locating and clamping means, not shown, are provided which properly register the assembly parts and secure the assembly 14 to the lower platen 12. The locating and clamping means may be of any conventional construction and therefore a detailed description of such means is not necessary.

With the assembly 14 fixed on the lower platen 12, as described, the lower platen is moved upwardly by the cylinders 13 to engage the runner plate 15 with the upper platen 11. The compressive forces applied to the assembly 14 by the platens 11 and 12 are transmitted through the runner and spacer plates respectively to the insert members 53, 71, and 72 so that the insert members 53, 71 are urged into engagement along their surfaces 65, 76 as previously noted. It is to be understood that the runner plate registers with the upper platen 11 so that the injection mechanism 21 is aligned with the opening 22 in the runner plate which communicates with the runners 19 for unimpeded injection of molding material into the cavities C (see FIG. 6).

The upper and lower platens are urged together by a relatively large compressive force which may be 100 tons or more, depending upon the number of cavities in the particular mold assembly, so that the unit pressure engaging force between the surfaces 65, 76 of the insert members 53, 71 is relatively large. With the mold parts held in pressure engagement as described, the ram 21a of the injection apparatus 21 is moved downwardly as viewed in FIG. 1 to flow molding material through the runner plate 15 into the cavity C as is the usual practice. The fluid pressure in the cavities C remains relatively low during the time that the trapped air is being bled therefrom, but when the cavities have been filled with the molding material, which is substantially uncompressible, the pressure of the material increases to a level which is sufficient to just overcome the compressive force on the assembly 14 and the surfaces 65, 76 of the members 53, 71 are urged apart slightly to permit flow of the molding material between the land surfaces and into the secondary cavities 80. Sufficient molding material is injected into the assembly 14 to permit the secondary cavities 80 to be completely filled by the molding material and injection of the material is terminated when the amount of molding material injected is sufficient to fill the cavities 80 and provide a continuous layer of the fluent material between the plates 16, 17. Since the secondary cavities 80 communicate with each other, as noted previously, the layer of molding material between the plates 16, 17 is substantially continuous.

With the molding material injected into the assembly 14 as described, the material is solidified or cured by a suitable process resulting in the runners 19 of the runner plate 15 being filled with cured rubber-like material, as well as the sprue holes 20, cavities C, and the material at the interface between the mold plates 16, 17. When the curing process is completed, the valve stems have been formed in the cavities C and a mat 100 of the molding material, contiguous with each of the tire stems, has been formed between the top and bottom plates 16, 17.

The mold assembly 14 is disassembled subsequent to solidifying of the material therein by removing the runner plate 15 from the assembly which exposes the upper surface of the top plate 16 and a mass of the molding material which has been cured in the opening 22 and runners 19. The mass of material is then stripped from the top plate 16 and since the material in the runners 19 is continuous with the material in the sprue holes 20, the sprues are also stripped from the top plate. It should be noted that the sprue holes 20 are tapered to provide a minimum diameter adjacent the cavity portion 45a which insures severing of the sprues adjacent the end portion 35 of each valve stem 25.

The top plate 16 is then removed from the assembly 14, exposing the end portions 35 of the valve stems 25 and the mat 100 (see FIG. 8).

The mat 100 includes a plurality of relatively thick annular bodies 101 which are formed in the secondary cavities 80, and which are integral with the bodies 101 formed about adjacent cavities. As best seen in FIG. 9, a narrow film-like strip 102 of material interconnects the inner periphery of each of the annular bodies 101 with the outer periphery of the head portions 35 of the valve support members 25 along a circumferential line adjacent the wall 38 of the groove 36, and a relatively thin sheet 103 of material which is formed between projections 52, 74 on the plates 16, 17 (see FIG. 9).

The film-like strip 102 between the body 101 and the head portion 35 of the valve support members 25 is formed by the molding material which has flowed between the land surfaces 65, 76 and is therefore extremely thin and structurally much weaker than the thickened body 101 surrounding it. In practice, the strips 102 have a thickness of around 0.005 inch, and since the radial dimension is small, the strips 102 are easily severed when subjected to a relatively small amount of tension.

The mat 100 is manually stripped from the bottom plate 17 by peeling the mat from the bottom plate, as illustrated in FIG. 8, so that the strips 102 of material surrounding the end portions 35 of the valve stems are uniformly severed, leaving a narrow uniform band 102a of the material on the periphery of the valve stems (see FIG. 2). Since the mat 100 is composed primarily of the interconnected annular bodies 101 (see FIG. 7) it may be manually peeled, as a unit, from the bottom plate 17 thereby severing the strips 102 as it is removed and exposing the top surfaces of the bottom plate 17 with the ends 35 of the valve stems protruding therefrom. Since the strips 102 of material are uniformly severed, no unsightly portions of material, namely flash, project from the valve stem.

As best illustrated in FIG. 3, the annular bead 37 extending around the portion 34 of the valve stem 25 is formed by a radially extending recess in the cavity C and the bead 37 functions to prevent inadvertent removal of any of the valve stems 25 from the bottom plate 17 as the mat 100 is stripped from the plate. After the mat 100 is removed, the valve stems are urged upwardly from the cavity portions 45b in the bottom plate by suitably constructed members (not shown) which engage the ends of the valve support members 26 in the bore 85 of the insert members 72 and urge the members 26 upwardly with sufficient force to disengage the beads 37 from the recesses in the cavity portion 45b. A rake-like member 105 (see FIG. 10) is then advanced along the upper side of the bottom plate 17 so that the end portions 35 are engaged between adjacent tines 106 of the rake and all of the valve stems are simultaneously lifted from the bottom plate by the rake 105.

As previously mentioned, the plates 16, 17 of the mold assembly 14 are generally rectangular when viewed in plan and the cavities C are disposed in the plates in a "square" arrangement. Mold assemblies have been built according to the invention to accommodate 289 cavities in a square arrangement having seventeen cavities on a side, as well as a 400 cavity square arrangement having 20 cavities per side. While exact numbers of cavities are not of particular importance, it is important to note that molding apparatus currently available for the manufacture of valve stems provides a maximum of approximately one third the number of cavities available in molding apparatus constructed according to the present invention.

The limitation on the number of cavities provided by prior art valve stem molding equipment results from the problem of avoiding the formation of flash on the finished articles while providing an injection pressure sufficient to completely fill a maximum number of cavities without flash formation on any of the articles. Thus, injection pressures have had to be accurately controlled and inspections of the finished articles for flash and incomplete formation have also been required. Furthermore, the runner plates in prior art devices have been complex due to molding material flow and pressure requirements at various locations in the mold assemblies.

The present invention utilizes high injection pressures to encourage flowing of the molding material between the mold plates of the apparatus, which would otherwise produce excessive flash on the articles if the mold parts were not constructed to provide for easy removal of the excess material from the molded articles. The high injection pressure permits complete filling of a greater number of cavities with relatively minor flow and pressure considerations involved in the formation of the runner plate 15. A portion of the runner plate 15 is illustrated in FIG. 8 and it can be seen from the figure that the opening 22 through the runner plate communicates with the runners 19 which are in the form of grooves or troughs in the plate extending radially away from the opening 22. Each runner communicates with a number of sprue holes 62 (shown in broken lines) in the top plate 16 and includes branch channels 19a for directing material to certain of the sprue holes.

The opening 22 is formed approximately at the center area of the plate 15 and thus, the runners 19 are of differing lengths according to which part of the square arrangement of cavities a particular runner extends. Runners for directing molding material to corners of the cavity arrangement have relatively few branch channels extending from them due to their length, so that proper injection pressure is maintained at the extremity of the runner. Runners for directing the molding material to sides of the square cavity arrangement have relatively large numbers of branch channels 19a and sprue hole connections due to the relative shortness of such runners. Due to the fact that the injection pressures are relatively high in comparison to the prior art apparatus of the type referred to, the runners 19 are of a constant cross-sectional area along their lengths and the branches 19a are of smaller constant cross-sectional area and there are relatively few interconnections between runners which is necessary in some prior art devices to provide an adequate flow of the molding material.

Another advantageous result of utilizing the present invention in the production of valve stems is the reduction in the amount of waste molding material per valve stem produced. Even though the mat 100 is of relatively large volume, the significant increase in the number of valve stems produced by a single molding operation according to the invention is such that although the total wasted material per operation of the apparatus is greater than that of the prior art devices; the waste material accompanying the production of a single valve stem is materially reduced since the number of molding operations required to produce a given number of valve stems is reduced by about one third. Furthermore, due to the high injection pressures, valve stems are reliably produced without inspection either for incomplete filling of the cavities or for excessive flash as is noted above.

While the invention has been described in reference to a particular construction and as utilizing an injection pressure sufficiently large to force parts of the molding apparatus apart to provide for formation of the mat 100, the invention could be practiced by construction of the molding apparatus wherein the mold parts surrounding the article forming cavities are separated to a very slight extent between the cavities and with the mold parts urged together by a larger compression force than that which could be overcome by injection pressure.

While a single embodiment of the present invention is illustrated and described herein in considerable detail, the present invention is not to be considered to be limited to the precise construction shown. It is my intention to cover hereby all adaptations, modifications, and uses of the invention which come within the scope of the appended claims.

Having described my invention, I claim:

1. A method of molding articles with a multipart molding assembly which at least partially defines primary cavities which substantially correspond to the configuration of the articles to be molded and interconnected secondary cavities which are located adjacent to the primary cavities and are separated from the primary cavities by parts of the mold assembly, said method comprising the steps of filling the primary cavities by flowing fluent molding material into the primary cavities, flowing fluent molding material from the primary cavities to the interconnected secondary cavities in a film extending between the parts of the mold assembly to the interconnected secondary cavities, maintaining said flow of fluent molding material from the primary cavities to the interconnected secondary cavities for a length of time sufficient to accumulate a continuous body of fluent molding material in the secondary cavities, forming the articles by solidifying the molding material in the primary cavities, forming a mat of a thick portion of molding material with film-like portions extending between and interconnecting the thick portion of the mat and the articles in the primary cavities by solidifying the film of molding material between the parts of the mold assembly to form the film-like portions and by solidifying the continuous body of fluent molding material in the interconnected secondary cavities to form the thick portion of the mat, removing at least one of the mold parts from the mold assembly, stripping the mat from the mold assembly by moving the thick portion of the mat relative to the articles in the primary cavities and thereby causing a rupturing of the film-like portions, and removing the articles from the primary cavities of the mold assembly after performing said step of stripping the mat from the mold assembly.

2. A method of molding as set forth in claim 1 wherein said steps of solidifying the material in the primary mold cavities and solidifying the material in the interconnected secondary cavities are performed contemporaneously.

3. A method of molding articles as set forth in claim 1 further including the method steps of urging the parts of the mold assembly toward each other to bring opposing surfaces on the parts of the mold assembly into abutting engagement and slightly separating the opposing surfaces of the mold assembly against the influence of said urging by subjecting the fluent molding material in the primary cavities to pressure to enables the fluent molding material to flow in a film between the opposing surfaces of the parts during said step of flowing fluent material from the primary cavities.

4. A method of molding articles as set forth in claim 1 wherein said step of removing the articles from the primary cavities includes the method steps of pressing against a lower end portion of the articles to partially eject the articles from the primary cavities, and simultaneously lifting a plurality of the partially ejected articles from the primary cavities.

References Cited

UNITED STATES PATENTS

| 1,765,819 | 6/1930 | Apple | 264—297 |
| 2,596,993 | 5/1952 | Gookin | 18—42 |
| 2,072,349 | 3/1937 | Wayne | 264—160 |
| 2,293,633 | 8/1942 | Shaw | 264—328 |

ROBERT F. WHITE, Primary Examiner

R. SHEAR, Assistant Examiner

U.S. Cl. X.R.

264—297, 328